SERIAL BINARY DIGITAL MULTIPLIER

Filed Nov. 27, 1951 6 Sheets-Sheet 1

INVENTOR
J. H. FELKER
BY J. W. Schmied
ATTORNEY

Aug. 14, 1956 J. H. FELKER 2,758,787

SERIAL BINARY DIGITAL MULTIPLIER

Filed Nov. 27, 1951 6 Sheets-Sheet 2

INHIBITOR CIRCUIT

USE OF ACTIVE ELEMENTS

A= PULSE TO BE RETIMED
B= DIGIT PULSES – REFERENCE PULSES FROM MASTER CLOCK

INVENTOR
J. H. FELKER
BY J W Schmied
ATTORNEY

Aug. 14, 1956 J. H. FELKER 2,758,787

SERIAL BINARY DIGITAL MULTIPLIER

Filed Nov. 27, 1951 6 Sheets-Sheet 3

INVENTOR
J. H. FELKER
BY
J W Schmied
ATTORNEY

Aug. 14, 1956 J. H. FELKER 2,758,787

SERIAL BINARY DIGITAL MULTIPLIER

Filed Nov. 27, 1951 6 Sheets-Sheet 4

BLOCK DIAGRAM
OF
ACCUMULATOR

INVENTOR
J. H. FELKER
BY
J W Schmied
ATTORNEY

PARTIAL BLOCK DIAGRAM
OF MULTIPLIER

BLOCK DIAGRAM
OF MULTIPLIER

INVENTOR
J. H. FELKER
BY J. W. Schmied
ATTORNEY

Aug. 14, 1956 J. H. FELKER 2,758,787

SERIAL BINARY DIGITAL MULTIPLIER

Filed Nov. 27, 1951 6 Sheets-Sheet 6

FIG. 11

EXAMPLE OF MULTIPLICATION

MULTIPLICATION OF 1001 BY 1101 IN W=4 SYSTEM

| TIME ← | WORD PULSES | MULTIPLICAND (DL1) | MULTIPLIER (DL2) | W+1 PULSES | POSITION OF SU2 | ADDER INPUT FROM SU2 | ADDER INPUT FROM DL4 | ADDER INPUT FROM DL5 | ADDER OUTPUT TO DL4 | ADDER OUTPUT TO DL5 | INTO DL4 FROM ADDER | INTO DL4 FROM DL4 | INTO DL5 FROM ADDER | INTO DL5 FROM DL5 | POSITION SU4 |
|---|---|---|---|---|---|---|---|---|---|---|---|---|---|---|---|
| 1 | 1 | 1 | 1 | 1 | | 1 | 0 | | 1 | | 1 | | | 0 | a |
| 2 | | 0 | 0 | | | 0 | 0 | | 0 | | 0 | | | 0 | a |
| 3 | | 0 | 1 | | a | 0 | 0 | | 0 | | 0 | | | 0 | a |
| 4 | | 1 | 1 | | | 1 | 0 | | 1 | | 1 | | | 0 | a |
| 5 | 1 | | 1 | | | 0 | | 0 | | 0 | | 1 | 0 | | b |
| 6 | | 1 | 0 | 1 | | 0 | 0 | | 0 | | 0 | | | 0 | a |
| 7 | | 0 | 1 | | | 0 | 0 | | 0 | | 0 | | | 0 | a |
| 8 | | 0 | 1 | | b | 0 | 1 | | 1 | | 1 | | | 0 | a |
| 9 | 1 | 1 | 1 | | | 0 | | 0 | | 0 | | 1 | 0 | | b |
| 10 | | | 0 | | | 0 | | 0 | | 0 | | 0 | 0 | | b |
| 11 | | 1 | 1 | 1 | | 1 | 0 | | 1 | | 1 | | | 0 | a |
| 12 | | 0 | 1 | | | 0 | 1 | | 1 | | 1 | | | 0 | a |
| 13 | 1 | 0 | 1 | | a | 0 | | 0 | | 0 | | 1 | 0 | | b |
| 14 | | 1 | 0 | | | 1 | | 0 | | 1 | | 0 | 1 | | b |
| 15 | | | 1 | | | | | 0 | | 0 | | 1 | 0 | | b |
| 16 | | 1 | 1 | 1 | | 1 | 1 | | 0 | | 0 | | | 0 | a |
| 17 | 1 | 0 | 1 | | | 0 | | 0 | | 1 | | 1 | 1 | | b |
| 18 | | 0 | 0 | | a | 0 | | 1 | | 1 | | 0 | 1 | | b |
| 19 | | 1 | 1 | | | 1 | | 0 | | 1 | | 1 | 1 | | b |
| 20 | | | 1 | | | | | | | 0 | | 0 | 0 | | b |

ANSWER = 0111 (DL5) 0101 (DL4)

INVENTOR
J. H. FELKER
BY J W Schmied
ATTORNEY 2,758,787

SERIAL BINARY DIGITAL MULTIPLIER

Jean H. Felker, Livingston, N. J., assignor to Bell Telephone Laboratories, Incorporated, New York, N. Y., a corporation of New York Application November 27, 1951, Serial No. 258,449

6 Claims. (Cl. 235—61)

This invention relates generally to computers and more particularly to digital computers of the variety known as serial binary computers.

More specifically, the invention disclosed and claimed hereinafter comprises a component of a computer, or the entire computer depending upon the scope of operations performed by same, herein referred to as a multiplier. The invention, as its name implies, is a computing means or machine for performing the process of multiplying two numbers.

A serial computer is one which handles and performs computing functions on a time basis, as distinguished from a spatial basis. That is, the functioning of the computer is based upon timed pulses occurring at regular intervals of time where each pulse, in the binary system of arithmetic, designates a denominational or exponential order of a base, such, for instance, as the base 2 which is used as exemplary in subsequent discussion. Any particular number in the binary equivalent of the more common decimal system of notation is represented by a succession of pulses or absences of pulses spaced in time and identifiable as digits. Each digit of the binary number represents, in a base 2 system, successive powers of 2 from 0 up to 4, if a 5-digit system, or up to 5, if a 6-digit system, etc., depending upon how high the exponents of the base 2 must go in order that the sum of all of such powers of 2 will equal the decimal number represented by the binary notation. The presence of a 1 in a digit place indicates the presence of one unit of that particular power of 2. The presence of a 0 in a digit place indicates the absence of a unit of that particular power of 2. The following table illustrates this relationship:

| $2^5$ | $2^4$ | $2^3$ | $2^2$ | $2^1$ | $2^0$ | |
|---|---|---|---|---|---|---|
| 1 | 0 | 0 | 1 | 1 | 0 | Binary Number=38 |
| 0 | 1 | 0 | 0 | 1 | 1 | Binary Number=19 |
| 1 | 0 | 1 | 0 | 1 | 0 | Binary Number=42 |

In serial binary computers the binary numbers appear a digit at a time spaced at regular intervals, such as every microsecond. Thus the above decimal number 38 will appear in the computer in the order of 0–1–1–0–0–1, representing pulses and absence of pulses spaced at regular intervals of time from left to right. Likewise the number 19 will appear as 1–1–0–0–1–0, the least significant digit appearing first.

Serial multipliers have been devised prior to the present invention and seem to have fallen into two varieties. A first variety is somewhat faster than the present invention but requires a greater amount of apparatus. The second variety is comparable to the present invention as to apparatus content but is somewhat slower in operation. Thus the present invention combines the advantages of both as to high speed of operation with a relatively small amount of apparatus.

The basic logic of multipliers is to provide means for multiplying each digit of the multiplicand by successive digits of the multiplier and means for adding the several partial products suitably displaced one digit place from each other. The abovementioned first variety of prior multiplier requires the use of more than one adder stage but uses no delay lines to feed the output of an adder back into its input and the process takes 2W digits time where each number is composed of W digits. The second variety uses only one adder but employs a delay line associated directly with the adder. The delay line stores each successive addition of partial products and feeds the result back to the adder input in time to be added to the next partial product in the proper time relation thereto. The process takes $W(2W+1)$ digits time and uses a delay line of 2W digits time delay. The present invention uses only one adder, similarly to the above second variety, but uses two delay lines associated directly with the adder. Each of these delay lines is of W digits time delay. The two delay lines are switched selectively across the adder and across respective recirculating circuits such that each delay line comes into play in cooperation with the adder to effect the proper addition of successive partial products in the proper time relationship. It is the provision of said two delay lines with one adder and suitable control means which is responsible for the combination of speed and a limited amount of apparatus embodied in the present invention.

Subsequent detailed description of an embodiment of the invention is based upon the drawings, of which the following are general descriptions of the various figures:

Fig. 11 is a table referred to in the detailed description as an aid to understanding the multiplier action.

The description to follow comprises two general sections. The first section, designated "General Description," describes the content of the basic units which are contained in the block diagrams of the multiplier and other parts of the computer. The second section, designated "Detailed Description of Multiplier," is, as its name implies, reserved for a detailed discussion of the functioning of the multiplier.

GENERAL DESCRIPTION

Figure 7:
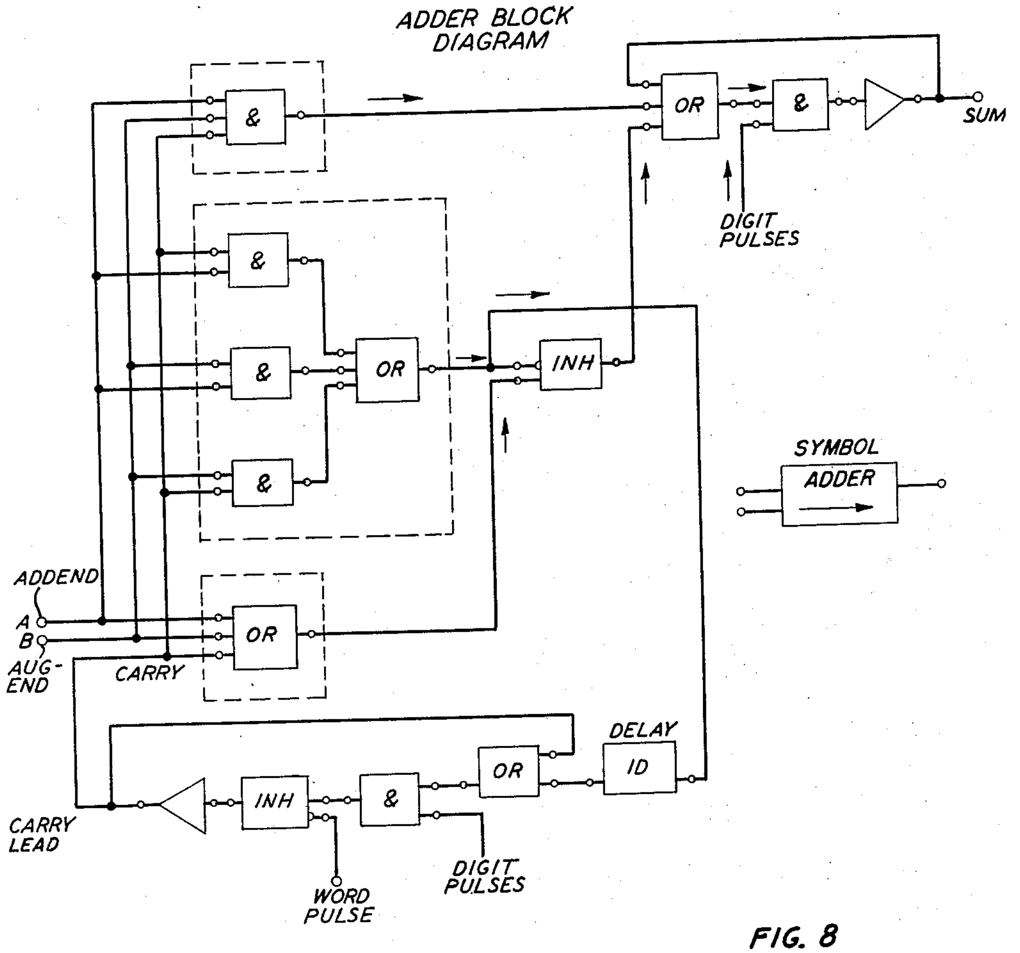
Fig. 7 is a block diagram of an adder and its symbol.
Figure 8:
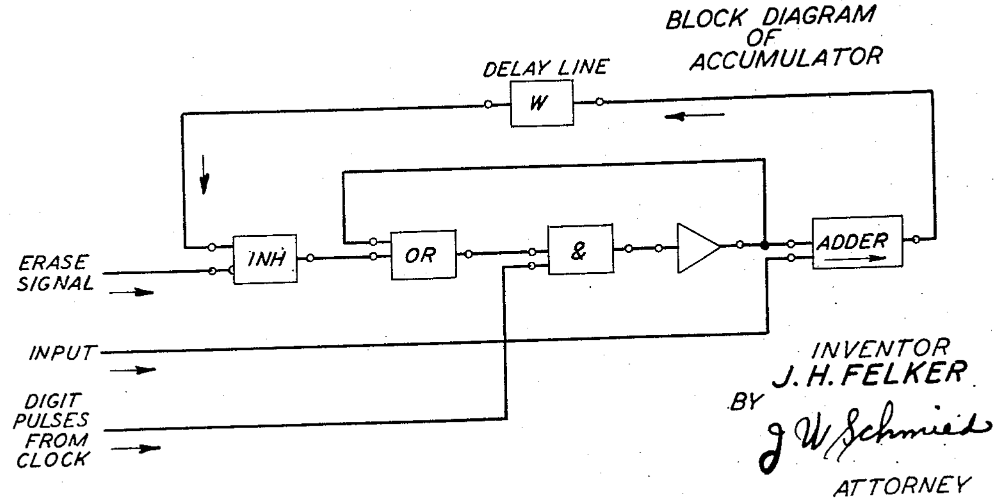
Fig. 8 is a block diagram of an accumulator.
Figure 9:
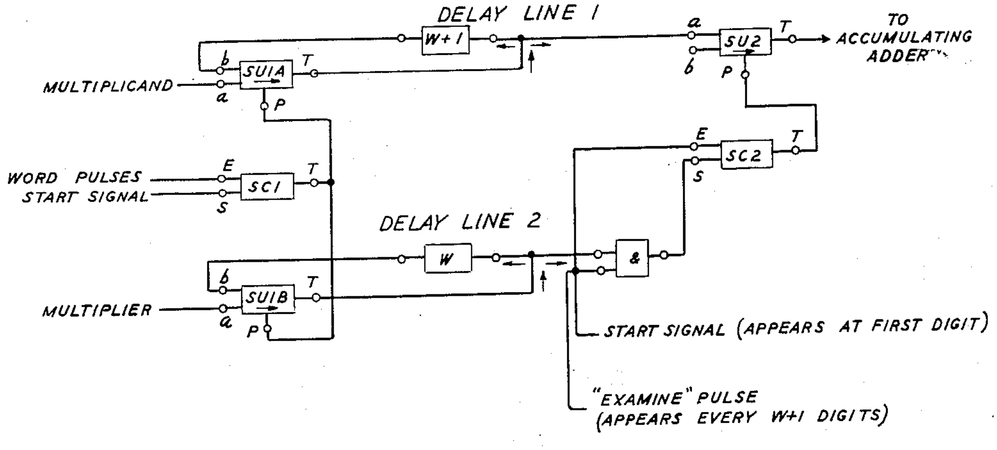
Figs. 9 and 10 are block diagrams of multipliers.
Figure 10:
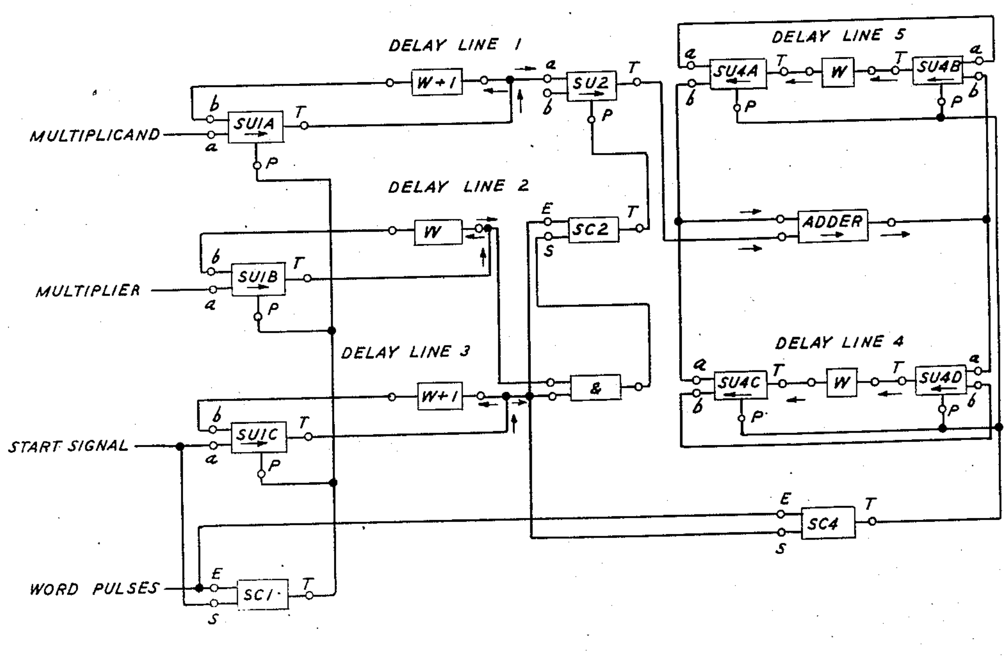

This general description covers a discussion of the circuitry shown in Figs. 1 through 8 of the drawings as a basis for discussion of the multiplier circuit shown in Figs. 9 and 10, the action of which is illustrated in Fig. 11.

*The or-circuit*

Figures 1, 2:
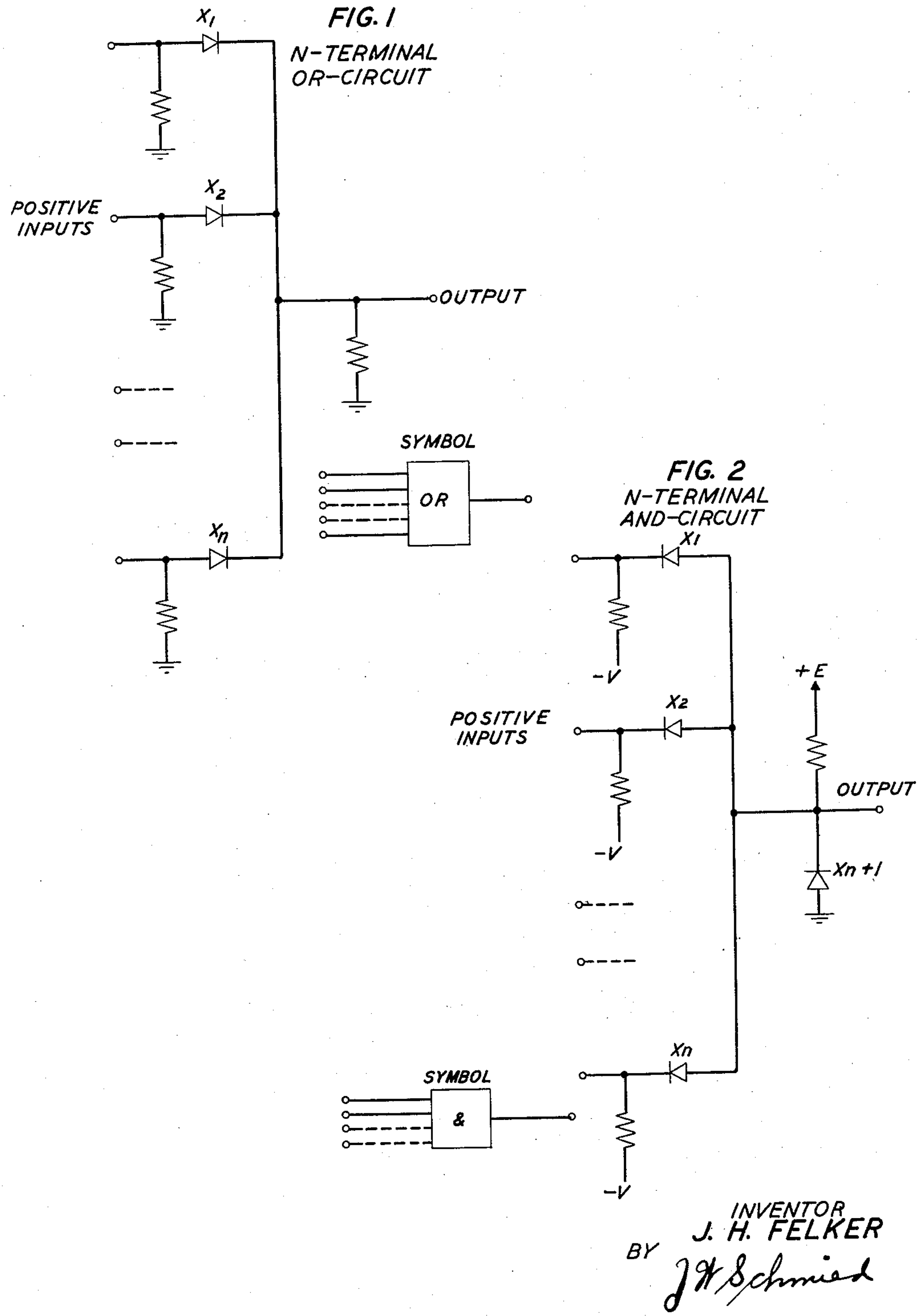
Fig. 1 shows an or-circuit and its symbol.
Fig. 2 shows an and-circuit and its symbol.

With reference to Fig. 1, an *n* terminal or-circuit is shown which develops an output when any one of its input terminals is energized by a positive pulse. The elements $X_1$, $X_2$ to $X_N$ may be crystal diodes or dry rectifiers or any other unidirectional asymmetric current carrying device which changes its impedance according to the polarity of the potential across its terminal. Such elements are put in series with each input to prevent a pulse at one input from feeding back to any of the other inputs. In the lower portion of Fig. 1 is shown the symbol for this or-circuit, which symbol is used in subsequent block diagrams to simplify the showing.

*The and-circuit*

Fig. 2 shows an and-circuit having *n* input terminals and which develops an output only when all *n* of the input terminals are energized by positive pulse inputs. Each of the inputs is returned to a negative voltage and the output is clamped slightly below ground by $X_{N+1}$. Only when all of the inputs rise above ground will $X_{N+1}$ be cut off permitting the output to rise. Thus, the output consists of the overlapping parts of the input.

Two terminal and-circuits are used extensively in serial computers for retiming signals. One terminal of the circuit is fed by the signal to be retimed while the other is fed by digit pulses from a master clock. There will be an output from the circuit only for the overlap of the master digit pulse and input signal. The circuit arrangement whereby the output is made a replica of the pulse from the clock is discussed subsequently in connection with Fig. 4.

*The inhibitor-circuit*

Figure 3:
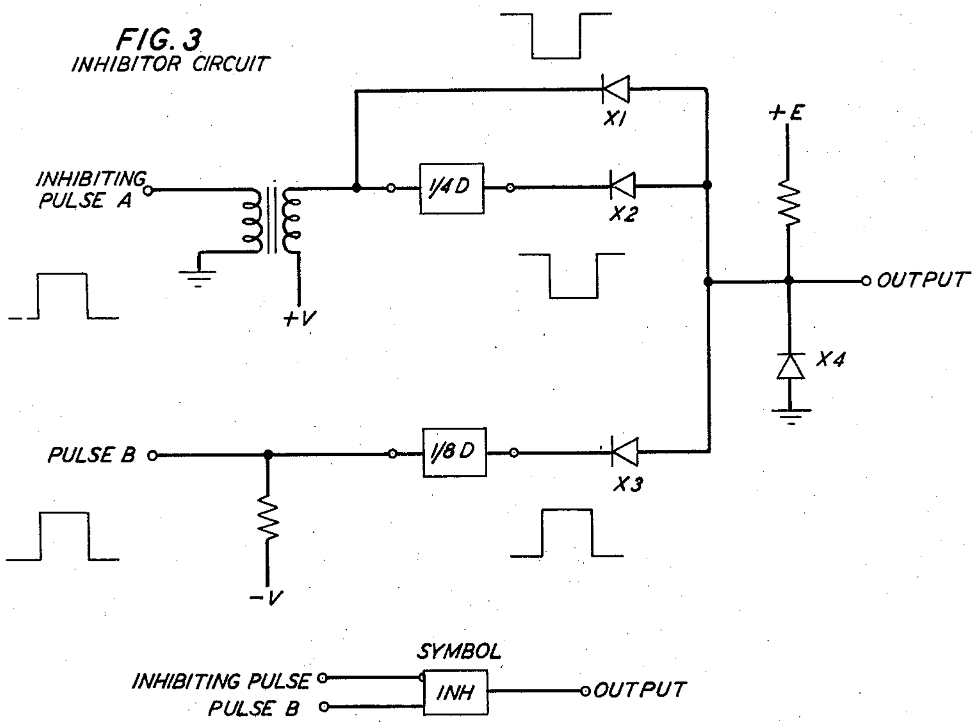
Fig. 3 shows an inhibitor-circuit and its symbol.

An inhibitor-circuit is shown in Fig. 3. An inhibitor-terminal can be added to any and-circuit or any or-circuit. Such a circuit operates as though there were no inhibitor-terminal when the inhibiting pulse is not transmitted. When the inhibiting pulse is present, however, the circuit prevents any output from being developed. The inhibiting-circuit used in this disclosure is of the simple variety shown in Fig. 3 where positive inputs synchronized in time are required. It will be noted that the signal to be inhibited is passed through an eighth digit delay line while the inhibiting pulse is passed both through and around a quarter digit delay line. This insures that the inhibitor pulse will, in effect, arrive earlier than the signal pulse and will last longer. In the absence of input pulses crystal $X_4$ will clamp the output at ground because input B is returned to a negative potential. It will be noted that $X_1$ and $X_2$ are returned through the transformer to a positive potential. If input B goes positive (without an inhibiting pulse appearing on input A), $X_4$ will be cut off and the output voltage will rise until it is clamped at the positive potential to which $X_1$ and $X_2$ are returned. If there is an inhibiting pulse (positive) it is inverted by the transformer and will carry the cathode of $X_1$ and $X_2$ negative, which will keep $X_4$ conducting no matter what happens at B. Thus, if pulses A and B were written as a two-digit binary number AB, the circuit translates 01 into a 1 at the output. It translates 00, 10 and 11 into 0 at the output.

*Use of active elements*

Active elements are shown herein as repeating amplifiers to make up for attenuation in crystal circuits and delay line. The standard use would include a timing feature as well as amplification. This proposition is disclosed in Fig. 4.

Figure 4:
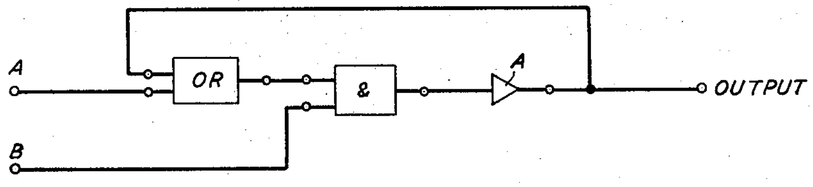
Fig. 4 illustrates by a block diagram the use of active elements, such as an emplifier, for retiming purposes.

In the design of the computer, wherever a pulse is likely to suffer intolerable attenuation, deformation, or a variable delay, a circuit like that of Fig. 4 is inserted.

The circuit shown has two inputs A and B. Input A is the pulse to be retimed and amplified. Input B comes from the master clock. This component supplies reference pulses (known as digit pulses) every digit time. These pulses are available in various phases, that is, with various but accurately controlled delays of a fraction of a digit time. The pulse fed to B is selected to rise sometime between the expected rises and falls of the pulses on A.

If there is no input on A, there will be no output from the amplifier A because of the and-circuit. If there is an input on A, when the digit pulse arrives, the amplifier output will rise with a rise time determined by the digit pulse (assuming that the amplifier pass band does not limit it). Part of the amplifier output is fed back through an or-circuit to the and-circuit. This insures that the output pulse will not fall until the reference digit pulse does, even though pulse A may have entered after B rose.

This reshaping with crystal circuits and an amplifier is the way in which every pulse is maintained with a desired time synchronization. Pulse A may vary somewhat in the delay it has suffered but the output pulse will still leave the amplifier at a time determined only by the reference pulse from the master clock. Thus, the pulses in the computer are made to have fixed durations and to occur at designated times.

*Delay lines, amplifiers and master clocks*

In the above discussion so-called delay lines have been referred to. It will be appreciated by those skilled in the art that what is meant by delay lines is the electrical circuit which will delay the output of an input pulse for a certain length of time. Such delay lines could comprise lumped impedances including successive series of lumped inductances with shunt capacity thereacross, as is well known in the art.

The above-mentioned amplifier may comprise any electronic or other amplifier arranged to amplify pulses at a high speed provided such amplifier has sufficient band width as above mentioned such that it will not unduly distort leading and trailing edges of the pulses. An amplifier which is particularly suited for use in the computer circuit disclosed herein is disclosed and claimed in Patent 2,670,445 to J. H. Felker of February 23, 1954. However, any suitable amplifier will suffice as will be readily appreciated by those skilled in the art.

Reference has been made previously to such things as a master clock and clock pulses and timing pulses. It is well known in the art that in digital computer circuits it is necessary to provide a master timing clock circuit from which pulses accurately controlled as to phase duration and time may be derived for the purposes of controlling the various functions of the machine. It is not considered necessary to the completeness of the present disclosure for showing all of the details of such a computer timing unit as the details thereof are fully within the knowledge of the art. For instance, a suitable timing unit is disclosed in a publication entitled "A digital computer timing unit" by R. M. Goodman at pages 1051 through 1054 of the Proceedings of the I. R. E., September 1951, volume 39, No. 9. Repeated reference will be made throughout subsequent description of such master clock timing pulses and such reference relates to such type of circuit as is shown in the above publication by Goodman.

*The storage cell*

The basic storage cell proposed herein is not a static device like a flip-flop but is an electric delay line plus an amplifier. When vacuum tubes are used this type of storage saves one active element in a one-digit storage cell and is believed to be a more reliable use of active elements. In larger storage units more elements will be saved.

Figure 5:
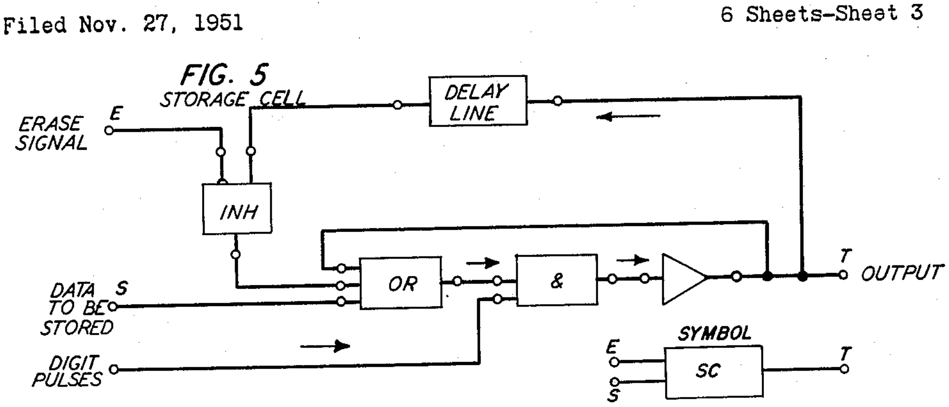
Fig. 5 is a block diagram of a storage cell and its symbol.

A block diagram of such a storage cell is shown in Fig. 5. The unit has three inputs: digit pulses, the signal to be stored, and an erase pulse. The digit pulses are received from the master clock every digit time and are used to retime the output of the delay line before it is amplified and recirculated. The erase signal is received whenever new data are to be stored and serves to erase the data in storage, blocking the delay line output from its input until the new data have been inserted.

The delay line may be long enough to store one word or just one digit of data. It is believed that up to fifteen-digit delay lines with lumped impedances can be built to hold the delay constant within a small fraction of one digit time. Depending upon the length of a word, it may be necessary to break one word line into sections and re-insert an amplifier between sections to retime and regenerate the pulses stored. At this point it may be stated that the retiming circuit of Fig. 4, as well as amplifiers alone, or inhibitor-circuits, may be inserted at many points throughout the circuits of the following description to accomplish additional function.

*Switches*

Figure 6A:
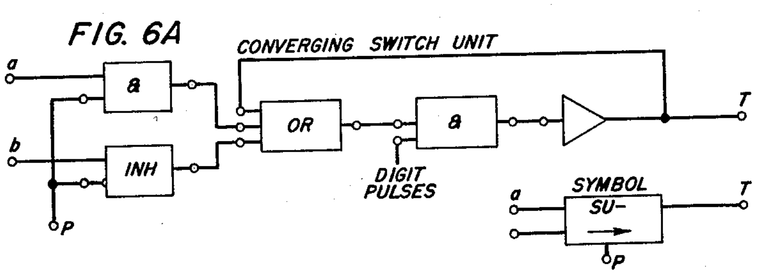
Fig. 6A is a block diagram of a converging type single-pole double-throw switch unit and its symbol.
Figure 6B:
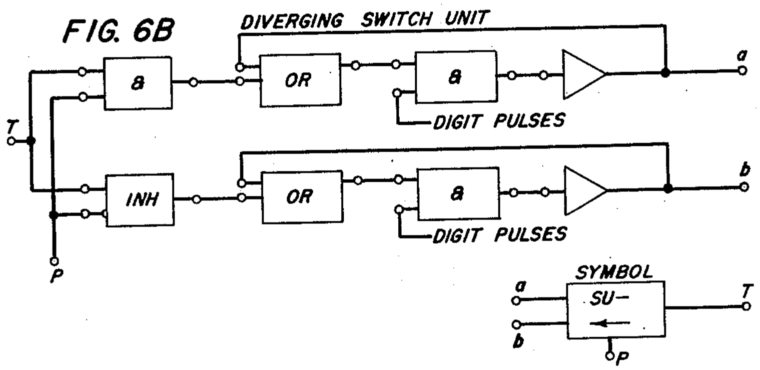
Fig. 6B is a block diagram of a diverging type single-pole double-throw switch unit and its symbol.

A switch comprises at least one storage cell like that of Fig. 5 and at least one switch unit like that of Fig. 6A or 6B, depending upon whether a converging or a diverging switch function is to be effected. A switch unit will assume a position according to the output instruction from the associated storage cell and the storage cell in turn is controlled by control signals which store therein or erase therefrom the switching instruction.

Fig. 6A shows a converging switch unit which can switch either of inputs "*a*" or "*b*" to a converging output T, the direction of information flow being indicated on the symbol as an arrow pointing to the common output terminal T.

Fig. 6B shows a diverging switch unit which can switch a common input T to one of the two outputs "*a*" or "*b*," the direction of information flow being indicated on the symbol as an arrow pointing away from the common input terminal T.

Switches are planned to combine a switching and a storage function. When a switch is given instructions to go to a particular position, it goes there and remembers that it is to remain there until unlocked by an erase signal.

Figure 6C:
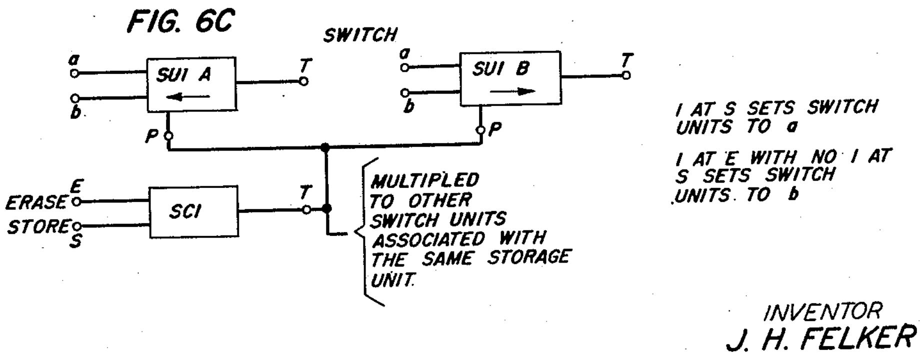
Fig. 6C illustrates how one storage cell like that of Fig. 5 can control one or more switch units like those of Figs. 6A and 6B to comprise a single-switch or ganged switches.

Fig. 6C discloses by means of the symbols for a storage cell and switch units the necessary elements of ganged single-pole double-throw switch units of either type. It will be obvious that if a switch is to be used as a single-pole single-throw switch, one of the terminals "*a*" or "*b*" will merely be disregarded; that is, not connected.

A single-pole double-throw switch as shown in Fig. 6C consists of a storage cell and a switch unit. When a 1 is stored in the storage unit, as the result of a pulse on a switching instruction lead, the left-hand and-circuit of the switch unit will pass signals to or from the "*a*" terminal while the inhibitor blocks signals to or from the "*b*" terminal. When a 0 is stored the and-circuit will block signals to or from the "*a*" terminal and the inhibitor-circuit in the switch unit will pass signals to or from the "*b*" terminal.

Whenever the switch is to be reset the erase signal is sent to the storage unit which then drops its old instruction and goes to position "*b*," unless the new instruction sets it to "*a*." A double-pole double-throw switch would have two switch units and one storage unit. A three- or four-pole switch would have three or four switch units, one storage unit and perhaps an extra amplifier to prevent the switch units from loading down the storage unit excessively. Such use of additional switch units with the same storage unit has been indicated in Fig. 6C by the multiple entitled "Multiplied to Other Switch Units Associated with the Same Storage Unit."

*Handling of negative numbers*

The last digit place of every number may be reserved to indicate the sign of the number. Positive numbers may have a 0 in the last place. A negative number is obtained by taking the two's complement of the positive number. This results in every negative number having a 1 in its last place.

This system is equivalent to the ten's complement method used in decimal calculators. In the decimal calculator operating with three significant figures, a fourth place may be provided for the sign. The number −187 might be represented by its ten's complement 9813. Then, for example, if −187 were required to be added to 500, the operation would be to add 9813 to 500 which gives 10313 and this is recognized as 0313 since the machine is assumed to have only four digit places.

As indicated above a negative number (two's complement) can be obtained in the binary computer by first forming the one's complement (changing all 0's to 1's and vice versa by means of an inhibitor-circuit) and then adding 1. The calculations illustrated below show examples of binary arithmetic performed with negative numbers.

(A)

Formation of Negative Numbers

| | | |
|---|---|---|
| +8= | 0 0 1 0 0 0 | |
| One's Complement= | 1 1 0 1 1 1 | |
| Add one | 1 | |
| ∴ −8= | 1 1 1 0 0 0 | |
| Check −8+8= | 0 | |
| +8= | 0 0 1 0 0 0 | |
| −8= | 1 1 1 0 0 0 | |
| Sum= | 1 0 0 0 0 0 0 | =Zero To the Machine |

(B)

Addition

| | | |
|---|---|---|
| −8+5=−3 | | |
| −8= | 1 1 1 0 0 0 | |
| +5= | 0 0 0 1 0 1 | |
| Sum= | 1 1 1 1 0 1 | =−3 |
| Check +3= | 0 0 0 0 1 1 | |
| Sum= | 1 0 0 0 0 0 0 | =Zero |
| −8+15=7 | | |
| −8= | 1 1 1 0 0 0 | |
| +15= | 0 0 1 1 1 1 | |
| Sum= | 1 0 0 0 1 1 1 | =7 |

*The adder*

The adder can be considered as a translator with three inputs: addend, augend and carry. It is a simple translator in that its output is a function only of the number of ones among its three inputs, as can be seen from the table set forth below:

BINARY ADDITION

| Inputs | | | Outputs | |
|---|---|---|---|---|
| Addend | Augend | Carry | Sum | New Carry |
| 0 | 0 | 0 | 0 | 0 |
| 0<br>0<br>1 | 0<br>1<br>0 | 1<br>0<br>0 | 1 | 0 |
| 0<br>1<br>1 | 1<br>1<br>0 | 1<br>0<br>1 | 0 | 1 |
| 1 | 1 | 1 | 1 | 1 |

The block diagram of a typical adder is shown in Fig. 7 wherein the combination in the above table of 0 0 0 is automatically taken care of as a 0 output with 0 carry. The three dashed circuits at the left of the block diagram recognize the other three situations among the three inputs. The situations are: at least one "1," at least two "1's", and three "1's" among the inputs. If there is only one "1," it will go through the bottom or-circuit, the following inhibitor-circuit, and then another or-circuit. After being reclocked and amplifier it will provide a "1" as the sum. In this case none of the and-circuits on the A, B and carry leads will have operated. If there are at least two "1's" on the A, B and carry leads, at least one of the three two-terminal and-circuits in the dashed box will be operated with two results. The output of the three-terminal or-circuit at the bottom left of the diagram will be inhibited so that it makes no contribution to the sum. In addition, a carry signal will be developed which is delayed one digit, reclocked and amplified to serve as the carry for the next augend and addend. If there are three "1's" the three-terminal and-circuit at the top and left-hand side of the diagram will operate and will develop a number "1." The three two-terminal and-circuits on the left of the diagram will also operate and will provide the carry.

The inhibitor-circuit in series with the carry lead should be noted. This circuit may be fed by a word pulse from the master clock as well as by the carry digits. The word pulse is received in synchronism with the first digit of every word. The world pulse will inhibit the carry pulse if one is present and will prevent a carry developed in one problem from being used in the next. This feature is required in the addition of negative numbers.

*The accumulator*

The block diagram of an accumulator is shown in Fig. 8. The output of the adder is sent back to its input through a W digit delay line. The output of the delay line is continuously reclocked in the and-circuit in accord with digit pulses from the master clock. The timed pulses are then amplified in a one-stage amplifier to make up for attenuation in the delay line. Whenever a new accumulation is to be started, an erase signal is sent to the inhibiting circuit. The signal is W digits long and blocks the output of the delay line from the adder and insures that the new accumulation will start from 0.

DETAILED DESCRIPTION OF MULTIPLIER

The multiplier that is discussed below is designed to multiply two positive numbers, each having W digits, in $W(W+1)$ digit times. This multiplier would obtain the correct sign for multiplication by negative numbers W/2 digits long. Operating at a megacycle rate, for instance, the product of two 48 binary digit numbers would be obtained in 2352 microseconds. It is believed most efficient to convert all negative numbers to positive ones before multiplying and to adjust the sign of the product according to the rules of algebraic multiplication. Components to be added to the multiplier to make the sign correction have not been included in this description. The multiplicand (X) is multiplied by the first (least significant) digit of the multiplier (Y) in the first $(W+1)$ period and by the W'th digit of Y during the W'th $(W+1)$ period. The W partial products are added together with each partial product moved over one place with respect to the preceding one as it is accumulated.

The multiplication table in binary arithmetic is very simple. If it is desired to multiply the binary number X by a single binary digit M, X is connected to the input of a switch that is held open if $M=0$ and closed if $M=1$. The output of the switch will be MX. Thus, in multiplying X by the successive digits of number Y, it is only required that X be recirculated through a switch that is opened and closed at the appropriate times according to whether the successive digits of Y are 0's or 1's.

Part of the multiplier is shown in the block diagram of Fig. 9. The multiplicand (X) is stored in delay line 1 and the multiplier (Y) is stored in delay line 2 when a start signal in phase with the first digits of X and Y throws switches SU1A and SU1B to the "*a*" position. After the first word period, SU1A and SU1B are thrown to position "*b*" by the word pulse which coincides with the emergence from DL2 of the least significant digit of the multiplier and the multiplier and multiplicand recirculate in their delay lines until the multiplication is finished. DL1 (delay line 1) storing the multiplicand has one more digit of delay than line DL2 in which the multiplier is stored. Therefore, after the first circulation of X through DL1, the least significant digit of X leaves DL1 just as the second least significant digit of Y leaves DL2. After the W—1'th circulation of X, its least significant digit leaves DL1 just as the most significant digit of Y leaves DL2.

The output of DL2 is fed continuously to an and-circuit. Every $W+1$ digits, an examining pulse is fed to the and-circuit and if the digit of Y coming out of DL2 is a one at that time the and-circuit develops a 1 in its output. If, when the examining pulse comes along, the coefficient of Y leaving DL2 is a 0, the and-circuit will have no output. Because DL2 has a delay of W digits, the and-circuit in effect filters out the successive digits of Y, choosing a new digit every $W+1$ digit times. The examining pulse is also sent as an erase signal to the storage cell SC2 associated with SU2. The output of the and-circuit goes to SC2 as a switching instruction and is stored there. Thus, SC2 stores either a 1 or a 0 according to whether the digit of Y examined is a 1 or a 0. The switch is arranged so that when a 1 is stored SU2 is closed, and when a 0 is stored SU2 is open.

A new partial product is obtained in the output of SU2 every $W+1$ digit times by the process described above. To accumulate them, an adder can be provided which accepts as one input the output of SU2, and as the other input its own sum output delayed by W digits. The one digit place difference in the arrival of the two inputs of the adder automatically provides the shift feature necessary in adding the partial products. The only difficulty is that the product of two W digit numbers may be a number 2W digits long which cannot be stored in the one-word delay line between the output of the adder and its input. Therefore, it is necessary to provide two delay lines and to use one of them to accumulate half of the answer and the other for the second half.

As the complete block diagram of Fig. 10 shows, at any time either DL4 or DL5 is receiving its input from the adder and is feeding its output back into the adder. At the same time, the other delay line is feeding its own output into its input. Switching of the delay line is performed by the four ganged sections SU4A, SU4B, SU4C and SU4D associated with the storage cell SC4. The switch is operated in such a way that the adder is connected to DL4 all of the first word period and to DL5 for one digit time longer of each succeeding word period, with the result that during the $W+1$'th word time the adder is connected to DL5 for the complete word period.

The switching instructions for SU4A, SU4B, SU4C and SU4D are developed in the following manner. The storage unit SC4 associated with SU4A, SU4B, SU4C and SU4D receives the word pulse from the master clock every W digit times and uses it as an erase signal to empty its one-digit delay line. Every $W+1$ digit times the examining pulse is fed to the storage unit SC4 and is stored there. SU4A, SU4B, SU4C and SU4D are arranged so that with a 1 in their storage unit SC4 they select position "*a*" and with a 0 in their storage unit SC4 they select "*b*." Thus SU4A, SU4B, SU4C and SU4D are at "*a*" from pulse 1 to pulse W, when the word signal at W erases the 1 in the storage unit. The switch goes to "*b*" and stops there for one digit time, then the $W+1$ pulse is written into the storage unit and the switch goes once more to "*a*." The second word pulse at 2W again erases the 1 in the storage unit and sends SU4A, SU4B, SU4C and SU4D to "*b*," where they stay for two digit periods until the second of $W+1$ pulse at $2(W+1)$ writes in another 1 and pulls SU4A, SU4B, SU4C and SU4D to "*a*." Thus SU4A, SU4B, SU4C and SU4D are held at "*b*" for one digit time longer each word period.

Fig. 11 gives a digit-by-digit account of the operation of a four-digit multiplier in multiplying 1001 by 1101. In studying the figure it is recommended that the reader keep in mind the positions of SU4A, SU4B, SU4C and SU4D at each step so that he can tell where DL4 and DL5 are connected. It should also be noted that the outputs of DL4 and DL5 are always their inputs of four digits earlier.

The following discussion relates to an analysis of Fig. 11 as mechanized by the circuit of Fig. 10. It is noted that the word pulses occur at the first digit time of each word, that is, at digit times 1, 5, 9, 13, 17, etc. In the $W+1$ pulse column, the 1 appearing at digit time 1 is the start signal which passes through the "*a*" position of switch SU1C to the input side of DL3, all of the switch units SU1A, SU1B and SU1C at digit time 1 being in position "*a*" by virtue of the start signal passing this instruction to the storage cell SC1. At the second word pulse at digit time 5 the instruction stored in SC1 is erased by the word pulse placing the switch units SU1A, SU1B and SU1C in the "*b*" position. These switch units stay in position "*b*" throughout the problem. The start pulse which was inserted into DL3 at digit time 1 will reappear at the output of DL3 every $W+1$ digit, namely, digit times 6, 11, 16, etc. The multiplicand and the multiplier are passed through the "*a*" positions of respective switch units SU1A and SU1B during the first word time. After the first word time, when switch units SU1A and SU1B are placed in their "*b*" positions, the multiplicand and the multiplier recirculate through DL1 and DL2 throughout the problem. Since DL1 has a delay time of $W+1$, each digit of the multiplicand will reappear at $W+1$ digit times. For instance, the least significant digit of the multiplicand will reappear at times 6, 11, 16, etc. DL2 has a delay time of W digits so that each digit of the multiplier will reappear from DL2 each W digit time. For instance, the least significant digit of the multiplier will reappear at digit times 5, 9, 13, 17, etc.

Each time the $W+1$ pulse reappears, the and-circuit will examine the digit of the multiplier then appearing at the input of DL2 such that at digit time 1 the least significant digit of the multiplier will be examined, at digit time 6 the second significant digit of the multiplier will be examined and the remaining two digits of the multiplier will be examined respectively at times 11 and 16. If the digit of the multiplier which is examined is a 1, then SC2 will be signaled by the and-circuit to place switch unit SU2 in the "*a*" position. If, however, the digit of the multiplier being examined is a 0, the $W+1$ pulse will signal the storage cell SC2 to place the switch unit SU2 in the "*b*" position. On Fig. 11 it is noted that at digit time 1 the multiplier digit examined is a 1, therefore, SU2 is placed in the "*a*" position. SU2 remains in the "*a*" position until digit time 6, at which point the digit of the multiplier which is examined is a 0. At this point SU2 is placed in the "*b*" position. SU2 remains in the "*b*" position until the next digit of the multiplier is examined at digit time 11. Since this digit is a 1, SU2 goes to the "*a*" position. Since the next digit of the multiplier is examined at digit time 16 and is found to be a 1, SU2 is again signaled to this effect with the result that it stays in the "*a*" position to the end of the problem.

During these 20 digit times, at those digit times when the switch unit SU2 is in the "*b*" position 0's will be passed to the adder and when SU2 is in the "*a*" position the digit of the multiplicand which appears at the input of DL1 during each of the digit times will be passed to the adder. This information is shown in the column which indicates which digits are passed from SU2 to the adder input.

At digit time 1 the start signal and a word pulse are both supplied to SC4, which thereupon places the associated switch units in the "*a*" position. At each $W+1$ pulse, namely, the digit times 1, 6, 11, 16, etc., SC4 is conditioned to place the associated switch units in the "*a*" position. At each word pulse time, which does not coincide with a $W+1$ pulse time, namely, digit times 5, 9, 13 and 17, SC4 is conditioned to place the associated switch units in the "*b*" position. From this information the column indicating the position of SU4— is derived.

At time 1 the adder input receives a 1 from SU2 and a 0 from DL4, giving an output of 1 from the adder into DL4. Also, a 0 is sent from DL5 into itself. At time 2 the adder receives inputs of 0 from SU2 and 0 from DL4, which produces a 0 output into DL4, a 0 also being transmitted from DL5 into itself. The same situation exists at digit time 3. At digit time 4 the adder receives an input of 1 from SU2 and a 0 from DL4 producing an output of 1 from the adder into DL4, a 0 being produced from DL5 into itself. At digit time 5 the adder receives an input of 0 from SU2 and a 0 from DL5 producing an output of 0 into DL5; but, at this time the digit of 1, which was placed into DL4 by the adder output at time 1, is transferred from DL4 back into DL4 through the "*b*" position of the switches. At digit time 6, with SU2 in the "*b*" position, the adder receives no input from SU2 and no input from DL4 and therefore produces no output into DL4, and since there previously has been no input to DL5, there is no output to DL5 into itself.

It is considered unnecessary to carry this analysis completely through Fig. 11 for each of the digit times since the results are obviously those shown in Fig. 11, where the net result is that during digit time 17 the least significant digit of the answer is a 1 transferred from DL4 into itself and the fifth significant digit, which is a 1, of the answer appears from the adder output going into DL5. At digit time 18 the second significant digit of the answer, a 0, is transferred from DL4 into itself and the sixth significant digit, a 1, is transferred from the adder output into DL5. At digit time 18 the third digit of the answer, a 1, goes from DL4 into DL4 and the seventh digit, a 1, goes from the adder into DL5. At digit time 20 the fourth digit, a 0, goes from DL4 into DL4 and the eighth digit, a 0, goes from the adder into DL5.

It is to be noted from the above discussion of Fig. 11 that half of the answer during digit times 17, 18, 19 and 20 is placed into DL4 and the other half of the answer is placed into DL5.

It is to be understood that the above-described arrangements are illustrative of the application of the principles of the invention. Numerous other arrangements may be devised by those skilled in the art without departing from the spirit and scope of the invention.

What is claimed is:

1. In a serial binary digital computer, a multiplier for multiplying two numbers represented by W binary digits and comprising an adder having an output conductor and an addend input conductor and an augend input conductor and a carry circuit for adding at said output conductor two series of binary digits appearing on respective addend and augend input conductors, means for storing digits of a multiplicand, means for storing digits of a multiplier, a source of timing clock pulses, means controlled by said source of clock pulses and by said multiplicand and multiplier storing means for multiplying the successive digits of said multiplicand by each digit in turn of said multiplier, means for applying to said adder augend input conductor W groups of W digits representing successive multiplications by said multiplying means of said multiplicand by each digit in turn of said multiplier, a first delay line, a first recirculating circuit, a second delay line, a second recirculating circuit, a two-position switch arranged when in its first position to connect said first delay line across said adder addend and adder output conductors and to connect said second recirculating circuit across said second delay line and arranged when in its second position to connect said first recirculating circuit across said first delay line and to connect said second delay line across said adder addend and adder output conductors, and means controlled by said source of clock pulses and by said multiplying means for controlling said two-position switch whereby said adder is enabled to accumulate the answer in said two delay lines.

2. In a serial binary digital computer, a multiplier for multiplying two numbers represented by W binary digits and comprising an adder having an output conductor and an addend input conductor and an augend input conductor and a carry circuit for adding at said output conductor two series of binary digits appearing on respective addend and augend input conductors, means for storing digits of a multiplicand, means for storing digits of a multiplier, a source of timing clock pulses, means controlled by said source of clock pulses and by said multiplicand and multiplier storing means for multiplying the successive digits of said multiplicand by each digit in turn of said multiplier, means for applying to said adder augend input conductor W groups of W digits representing successive multiplications by said multiplying means of said multiplicand by each digit in turn of said multiplier, a first delay line, a first recirculating circuit, a second delay line, a second recirculating circuit, a two-position switch arranged when in its first position to connect said first delay line across said adder addend and adder output conductor and to connect said second recirculating circuit across said second delay line and arranged when in its second position to connect said first recirculating circuit across said first delay line and to connect said second delay line across said adder addend and adder output conductors, and means for setting said two-position switch to alternate positions at certain times whereby said adder is enabled to accumulate in said delay lines the sum of the W partial products in $W(W+1)$ digit times.

3. In a serial binary digital computer, a multiplier for multiplying two numbers represented by W binary digits and comprising an adder having an output conductor and an addend input conductor and an augend input conductor and a carry circuit for adding at said output conductor two series of binary digits appearing on respective addend and augend input conductors, a first conductor and means for applying thereto successive digits of a multiplicand at a reference time and for reapplying said digits thereto at regular constant intervals, a second conductor and means for applying thereto successive digits of a multiplier at a reference time and for reapplying said digits thereto at regular constant intervals, a third conductor and means for applying thereto a start pulse to establish said reference time and for reapplying said start pulse thereto at regular constant intervals, a first switch having an open and a closed position and interconnecting said first conductor with said adder augend input conductor, means controlled jointly by concurrent pulses on both of said second and third conductors for closing said first switch and controlled by a pulse on said third conductor but not on said second conductor for opening said first switch, a fourth conductor and means for applying thereto a pulse at said reference time and for reapplying said pulse thereto at regular constant intervals, a first delay line, a first recirculating circuit, a second delay line, a second recirculating circuit, a second two-position switch arranged when in its first position to connect said first delay line across said adder addend and adder output conductors and to connect said second recirculating circuit across said second delay line and arranged when in its second position to connect said first recirculating circuit across said first delay line and to connect said second delay line across said adder addend and adder output conductors, means controlled by the electrical condition of said third and fourth conductors for setting said second switch to its first position when digit pulses are applied to said third conductor and for setting said second switch to its second position when digit pulses are applied to said fourth conductor but not to said third conductor.

4. In a serial binary digital computer, a multiplier for multiplying two numbers represented by W binary digits and comprising an adder having an output conductor and an addend input conductor and an augend input conductor and a carry circuit for adding at said output conductor two series of binary digits appearing on respective addend and augend input conductors, a first conductor and means for applying thereto successive digits of a multiplicand beginning at a reference time and for reapplying said digits thereto after successive delays of $n$ digit times where $n$ is equal to or greater than $W+1$, a second conductor and means for applying thereto successive digits of a multiplier beginning at said reference time and for reapplying said digits thereto after successive delays of $n-1$ digit times, a third conductor and means for applying thereto a start pulse at said reference time and for reapplying said pulse thereto after successive delays of $n$ digit times, a first switch having an open and a closed position and interconnecting said first conductor with said adder augend input conductor, means controlled jointly by concurrent pulses on both of said second and third conductors for closing said first switch and controlled by a pulse on said third conductor only for opening said first switch, a fourth conductor and means for applying thereto a pulse at said reference time and for reapplying said pulse thereto after successive delays of $n-1$ digit times, a first delay line of $n-1$ digit times, a first recirculating circuit, a second delay line of $n-1$ digit times, a second recirculating circuit, a second two-position switch arranged when in its first position to connect said first delay line across said adder addend and adder output conductors and to connect said second recirculating circuit across said second delay line and arranged when in its second position to connect said first recirculating circuit across said first delay line and to connect said second delay line across said adder addend and adder output conductors, means controlled by the electrical condition of said third and fourth conductors for setting said second switch to its first position when digit pulses are applied to said third conductor and for setting said second switch to its second position when digit pulses are applied to said fourth conductor but not to said third conductor.

5. In a a serial binary digital computer, a multiplier for multiplying two numbers represented by W binary digits and comprising an adder having an output conductor and an addend input conductor and an augend input conductor and a carry circuit for adding at said output conductor two series of binary digits appearing on respective addend and augend input conductors, a first conductor and means for applying thereto successive digits of a multiplicand beginning at a reference time and for reapplying said digits thereto after successive delays of $W+1$ digit times, a second conductor and means for applying thereto successive digits of a multiplier beginning at said reference time and for reapplying said digits thereto after successive delays of W digit times, a third conductor and means for applying thereto a start pulse at said reference time and for reapplying said pulse thereto after successive delays of $W+1$ digit times, a first switch having an open and a closed position and interconnecting said first conductor with said adder augend input conductor, means controlled jointly by concurrent pulses on both of said second and third conductors for closing said first switch and controlled by a pulse on said third conductor only for opening said first switch, a fourth conductor and means for applying thereto a pulse at said reference time and for reapplying said pulse thereto after successive delays of W digit times, a first delay line of W digit times, a first recirculating circuit, a second delay line of W digit times, a second recirculating circuit, a second two-position switch arranged when in its first position to connect said first delay line across said adder addend and adder output conductors and to connect said second recirculating circuit across said second delay line and arranged when in its second position to connect said first recirculating circuit across said first delay line and to connect said second delay line across said adder addend and adder output conductors, means controlled by the electrical condition of said third conductor for setting said second switch to its first position when digit pulses are applied to said third conductor, and means controlled by the electrical condition of said third and fourth conductors for setting said second switch to its second position when digit pulses are applied to said fourth conductor but not to said third conductor.

6. In a serial binary digital computer, a multiplier for multiplying two numbers represented by W binary digits and comprising an adder having an output conductor and an addend input conductor and an augend input conductor and a carry circuit for adding at said output conductor two series of binary digits appearing on respective addend and augend input conductors, a first conductor and means for applying thereto successive digits of a multiplicand beginning at a reference time, means for reapplying said multiplicand to said first conductor every $W+1$ digit times, a second conductor and means for applying thereto successive digits of a multiplier beginning at said reference time, means for reapplying said multiplier to said second conductor every W digit times, a third conductor and means for applying thereto a start pulse to establish said reference time, means for reapplying said start pulse to said third conductor every $W+1$ digit times, a first switch having an open and a closed position and arranged when closed to interconnect said first conductor with said adder augend input conductor, means controlled jointly by the electrical condition of said second and third conductors for closing said first switch only when digit pulses are applied concurrently to said second and third conductors, means controlled by said third conductor for opening said first switch when digit pulses are applied to said third conductor but not to said second conductor, a fourth conductor and means for applying thereto a pulse every W digit times beginning at said reference time, a first delay line of W digit times, a first recirculating circuit, a second delay line of W digit times, a second recirculating circuit, a second two-position switch arranged when in its first position to connect said first delay line across said adder addend and adder output conductor and to connect said second recirculating circuit across said second delay line and arranged when in its second position to connect said first recirculating circuit across said first delay line and to connect said second delay line across said adder addend and adder output conductors, means controlled by the electrical condition of said third conductor for setting said second switch to its first position when digit pulses are applied to said third conductor, and means controlled by the electrical condition of said third and fourth conductors for setting said second switch to its second position when digit pulses are applied to said fourth conductor but not to said third conductor.

References Cited in the file of this patent

UNITED STATES PATENTS

| | | |
|---|---|---|
| 2,556,200 | Lesti | June 12, 1951 |
| 2,590,950 | Eckert | Apr. 1, 1952 |

OTHER REFERENCES

A Functional Description of the Edsac by the Moore School of EE; volume 1, pages 4–18 through 4–24; volume 2, drawing 104–3LD–2. November 1, 1949.

The Edsac—an Electronic Calculating Machine; article by Wilkes et al.; appearing in the "Journal of Scientific Instruments and Physics on Industry" (now known as the Journal of Scientific Instruments); volume 26, December 1949, pages 385–391.